3,210,323
ISOCYANATE CROSSLINKED POLYHY-
DROXYLATED POLYETHYLENE
Richard W. Bush, Takoma Park, Razmic S. Gregorian, Silver Spring, and Frank X. Werber, Rockville, Md., assignors to W. R. Grace & Co., New York, N.Y., a corporation of Connecticut
No Drawing. Filed Jan. 20, 1964, Ser. No. 338,594
7 Claims. (Cl. 260—77.5)

This invention relates to crosslinked polymer products and methods of preparing same. More particularly this invention is concerned with polyhydroxylated polymeric material crosslinked with polyisocyanates.

Prior art teaches the modification of polyethylene alcohol telomers of the formula:

$$CH_3(CH_2-CH_2)_nC(OH)(CH_3)_2$$

by heating said telomers with an organic polyisocyanate. See U.S. 2,845,413. The reaction takes place at the terminus of the polymer molecule thereby modifying the polymer molecule by adding another polyethylene telomer molecule thereto through the isocyanate groups.

Surprisingly, it has not been found possible to crosslink a polymeric material by subjecting said polymeric material containing carbonyl groups to the action of a reducing agent consisting essentially of a metal alkoxide compound of the general formula:

$$M(OR)_{y-z}X_z$$

wherein M is aluminum or titanium, OR is an alkoxy group containing 1 to 8 carbon atoms, X is halogen, hydrogen or an alkyl containing 1 to 8 carbon atoms, y is equal to the valence of M, and z is equal to 0 to y—1, contacting the polymeric material with water thus forming polyhydroxylated polymeric material and thereafter subjecting the polyhydroxylated polymeric material at a temperature above its melting point up to 250° C., to the action of an organic polyisocyanate to crosslink the polymeric material.

As used herein the term "organic polyisocyanate" means a compound of the formula:

$$R(NCO)_x$$

wherein R is a hydrocarbon group containing at least four carbon atoms and x is 2 or more.

As used herein "polyhydroxylated polymeric material" means polymeric material containing more than 2 hydroxyl groups per polymer molecule.

The reducing agents depicted by the aforesaid general formula are hereinafter referred to as "metal alkoxides."

In the above formula for the reducing agent, it is to be understood that the alkoxy groups can be different, e.g. OR can be isopropoxy and butoxy in the same molecule. Additionally, it is also possible to have mixtures of the above reducing agents. For example, it is possible to have 50% Al(OR)Cl$_2$ and 50% Al(OR)$_2$Cl; in the mixture, thus z is equal to 1.5.

By the term "carbonyl group" as used throughout this invention is meant a ketone or aldehyde group. The carbonyl groups may comprise a part of the main polymer chain or may be present on a branch or both.

The carbonyl groups may be introduced in any of various ways, e.g., by oxidation of hydrocarbon groups in α-olefinic polymer or copolymer chains or alternatively, by polymerization or copolymerization of carbonyl-containing monomers. Such monomers include but are not limited to methyl vinyl ketone, acrolein, and carbon monoxide, to name a few. When these monomers are copolymerized, the comonomer can be a polymerizable olefin, styrene, or other monomer. No limitation is placed on the relative proportions of comonomer to carbonyl-containing monomer except that the copolymer contain sufficient carbonyl to become polyhydroxylated as defined herein after reduction and hydrolysis. It should be understood that subsequent formation of hydroxyl groups can only occur at carbonyl sites which have reacted with the metal alkoxide reducing agent. It should also be understood that crosslinking of the polyhydroxylated polymer by the polyisocyanate will only occur through the reaction of the OH groups on the polymer. Crosslinking as used herein means the formation of a three dimensional structure.

Ordinarily a catalyst is required to promote the reaction between isocyanates and hydroxyl groups. Tertiary amines such as triethylene diamine and transition metal salts such as stannic chloride are commonly employed as catalysts for the reaction. In the instant invention as will be shown hereinafter no catalyst is necessary.

It should be noted that this process is not necessarily confined to addition polymers. It also applies to condensation polymers containing carbonyl functions. One example of such is a condensation polymer of acetone dicarboxylic acid and hexamethylene diamine. Such polymers can be polyhydroxylated and subjected to isocyanate crosslinking.

Olefin polymers such as polyethylene described in U.S. 2,153,553 and in U.S. 2,816,883 and polypropylene described in Belgian 543,259 are well known in the art today and are generally characterized by their organic solvent solubility and their thermoplastic properties. Lately, several methods have been tried with varying success to modify the physical properties of these polymers by crosslinking the polymer. Such methods include electron impingement of the polymer and blending of free radical liberating substances into the polymer.

In regard to crosslinking polymers, the principal methods employed to date have involved blending of free radical liberating substances into the polymer. For example, organic peroxides and azo compounds, the most widely utilized crosslinking agents, decompose and crosslink polymers by free radical mechanisms. Free radical crosslinking of polymeric material such as polyethylene has the disadvantage that for optimum efficiency the curing step must be performed in an oxygen-free atmosphere. Thus there has been a long felt want of a method to crosslink polyethylene which is operable in an oxygen-containing atmosphere.

One object of the invention is to disclose a method of crosslinking polyhydroxylated polyethylene by a non-radical mechanism in an oxygen-containing atmosphere.

Another object of the invention is to supply a polyethylene crosslinked with an isocyanate. In the present invention the carbonyl groups in the polymeric material react with the metal alkoxide reducing agents of the instant invention in the manner of the Meerwein-Ponnodorf-Verley reduction thereby affording polymer that contains metal-oxygen-polymer bonding which after being subjected to hydrolysis, can be crosslinked with polyisocyanates.

The advantages of the present system over crosslinking by a free radical mechanism include: (1) better control of the degree of cross-linking by controlling the number of carbonyl groups and (2) the ability to crosslink in the presence of oxygen. In free radical systems, an inert atmosphere is required as oxygen has an adverse effect on crosslinking.

Any of the various well-known types of polyethylene can be used in making crosslinked polyethylene by the practice of this invention. Such polyethylenes include the branched low-density (i.e., about .910 to about .925) material as well as the medium density materials and the newer linear high density (about .950 to .980) materials made by the Ziegler process (TiCl$_4$–Al alkyl catalyst) and the Phillips process (hexavalent chromia on silica-alumina support). The linear polyethylenes having melting points in the range of 120–137° C. and the branched low density polyethylenes having melting points in the range 90–110° C. The polymers can be of any desirable molecular weight, the only critical point being that the polymers contain more than two hydroxyl groups per polymer molecule after oxidation, reduction and hydrolysis. Two or less hydroxyl groups per polymer molecule will lead only to a grafting reaction or at best chain extension.

The process by which oxidation of the polymeric material is performed is not critical. Polyolefins can be readily oxidated by various well-known methods to give degraded polymers containing carbonyl groups. For example, polyolefins can be milled in air at a temperature in the range 160–200° C. Another method would include passing air into an oven over a polyolefin therein in the solid state at a temperature below its melting point. Still another method would be to suspend particles of the polyolefin in water or an organic solvent and either bubble air through the suspension or pressurize the system with air at 100–200° C. Yet another method would be to pass air at a temperature in the range of 100–200° C. through a fluidized bed of polyolefin particles. A further method would include pressing the polyolefin into film form and passing hot air at a temperature of 100–200° C. thereover.

After the polymer has been oxidized, the addition of the metal alkoxide results in Polymer-O—M bonds through the reduction of the carbonyl groups in the oxidized polymer by the metal alkoxides in the manner of the Meerwein-Ponnodorf-Verley reaction.

When the metal alkoxide employed is at least bifunctional, i.e. contains at least two alkoxy groups, it is possible for crosslinking to occur via Polymer-O—M—O-Polymer bonds. Such crosslinks will be broken on the addition of water as shown by the formation of hydroxyl groups at the bonding sites.

However, the performance of this invention does not require that the metal alkoxide reducing agent act as a crosslinking agent. Reaction of only one alkoxyl group of a given alkoxide molecule with a polymeric carbonyl group will form a site sufficient for subsequent hydroxylation whereat reaction with isocyanate will occur.

The following examples are set down to illustrate the invention and are not deemed to limit its scope.

Throughout the instant invention the melt indices (MI) were measured under the conditions specified in ASTMD 1238–52T.

The densities of the polymer were measured under the conditions specified in ASTMD 1505–57T.

The percent carbonyl in the oxidized polymer was measured by infrared on a Perkin-Elmer Model 221 Spectrophotometer. In the examples, unless otherwise noted, a Brabender Plastograph Model P1-V2 equipped with a recording unit for measuring changes in torque was used for reactions on the oxidized polymeric material. The aforesaid recording unit had a range of 0–1000 units equal to 0–1 kilogram-meter of torque. This range can be increased when necessary to 0–5000, i.e., equal to 0–5 kilogram-meters of torque by the addition of weights.

The degree of crosslinking can be measured in various ways. For example one method is to measure the percent gel of the crosslinked material after refluxing in xylene. In addition, the degree of crosslinking is related to the increase in torque measured by the Plastograph recorder from the time the polyisocyanate crosslinking agent is added to the fused polymeric material until the reaction is discontinued either prematurely or because maximum torque has been achieved. The greater the degree of crosslinking the greater the viscosity of the polymeric material which in turn requires a greater torque in order to drive the Plastograph at a constant r.p.m. Conversely, the formation of polyhydroxylated polymer from polymer containing Polymer-O—M—O-Polymer bonds formed by the reaction of metal alkoxide reducing agents which are at least bifunctional and the carbonyl-containing polymer can be measured by a decrease in torque. For example, when water is added to polymer containing crosslinks formed by the use of metal alkoxide reducing agents which are at least bifunctional, there is a rapid and appreciable decrease in torque. This is due to the hydrolysis of the metal-containing crosslinks to hydroxyl groups. For example when the metal alkoxide is an aluminum alkoxide the reaction is as follows:

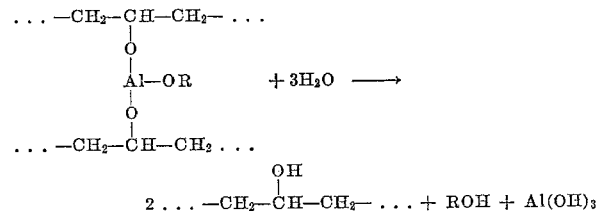

$$2 \ldots -CH_2-\overset{OH}{\underset{|}{C}H}-CH_2- \ldots + ROH + Al(OH)_3$$

The hydroxyl groups dispersed along the polymer chain thereafter react with the polyisocyanates

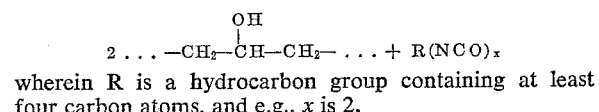

wherein R is a hydrocarbon group containing at least four carbon atoms, and e.g., $x$ is 2,

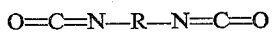

to form crosslinks along the polymer chain in the melt as follows:

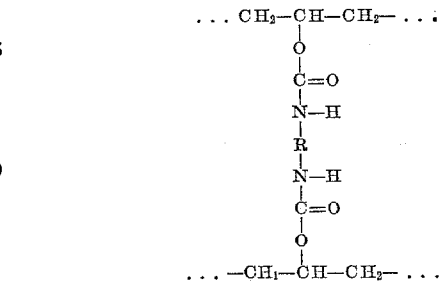

A further check of the degree of crosslinking is the change in melt index due to crosslinking of the polymeric material. Since melt index varies inversely with viscosity which varies directly with degree of crosslinking; a lower melt index after crosslinking evidences that crosslinking occurred. An indication of the amount of reduction is the decrease in the percent carbonyl after the addition of the reducing agent. Percent carbonyl is defined as $$\frac{\text{gms. } C=O}{\text{gms. polymer}} \times 100$$

Unless otherwise noted, all parts and percentages are by weight in the examples.

To show the percent decrease of carbonyl in the polymeric material after reduction, the addition of the reducing agent and the steps thereafter were performed in an inert atmosphere, i.e., nitrogen. Ordinarily, in commercial practice, the steps in the invention are performed in air.

As will be shown hereinafter, reduction of polymeric material containing carbonyl groups by the present invention can be carried out in a heterogenous two-phase system at temperatures below the melting point of the polymeric material.

*Example I*

1125 grams of unstabilized polyethylene having a melt index of 0.7 and a density of 0.96 were milled in air in a Banbury B mixer for 2 hours at 160–171° C. The resulting polymer had a melt index of 1.65 and contained 0.123% carbonyl as ascertained by infrared analysis. A 35 grams portion of the thus milled polymer was charged under nitrogen to a Brabender Plastograph and milled under a nitrogen atmosphere until molten. 0.63 gram of aluminum isopropoxide was added to the molten polymer under nitrogen and milling was continued for 10 minutes. The increase in torque measured from the time the aluminum isopropoxide was added to the molten polymer until maximum torque was obtained, was equal to 4150 meter-grams. A sample of the thus-crosslinked polymer on analysis had a melt index of 0.0 and a carbonyl content of 0.024%. Milling was continued and 10 ml. water was added gradually to the molten polymer. After 4.5 minutes, during which time the water was being added, the torque decreased 3600 meter-grams. Milling was continued and 0.22 ml. of 2,4-toluene diisocyanate was added to the molten polyhydroxylated polymeric material. After 4 minutes the torque increased 1200 meter-grams due to the polymeric material being crosslinked at its hydroxyl sites by the diisocyanate. Further evidence for crosslinking was shown by the fact that the polymer contained 32% gel, as determined by extraction with refluxing xylene. The infrared spectrum of the resulting crosslinked polymer exhibited a band at 1740 cm.$^{-1}$, characteristics of a urethane carbonyl group.

To show that crosslinking with the diisocyanate will not occur unless the polymer has been reduced and hydrolyzed the following run was made.

*Example II*

The reaction and procedures of Example I were followed except that no aluminum isopropoxide or water was added to the molten carbonyl containig polymer. After the addition of 0.2 ml. of 2,4-toluene diisocyanate and further milling for 10 minutes no increase in torque was obtained and no urethane absorption was observed in the infrared spectrum.

To show that the reduction step of this invention is operational at temperatures below the melting point of the polymer to be hydroxylated the following run was made.

*Example III*

0.7 melt index unstabilized polyethylene (density 0.96) in flake form having a melt point of 135° C. was oxidized by heating in air at 125° C. for 26 hours. Forty grams of the thus oxidized polymer, containing 0.70% carbonyl and having a melt index higher than 20.0 was suspended in 1000 ml. of dry benzene, and the suspension was heated to reflux under a nitrogen atmosphere. Four grams of aluminum isopropoxide was added, and the benzene was distilled over a three hour period, additional dry benzene being added to the suspension as necessary. A sample of the resulting polymer was washed with fresh benzene and on characterization had a melt index of 0.49. About 500 ml. of water was added to the suspension and steam was bubbled into it. The steam distillation was continued for two hours. The polymer was collected by filtration and on characterization had a melt index of 2.49.

The increase in melt index shows that C—O—Al bonds were hydrolyzed with the formation of C—O—H groups. The resultant polymer undergoes the same reactions as polyhydroxylated polyethylene prepared by the addition of water to molten aluminum-reduced polyethylene as shown by the following run. 35 grams of the polyhydroxylated polymer was charged to a Brabender Plastograph maintained at a temperature of 160° C. under nitrogen. When the polymer was molten, 0.5 ml. of 2,4-toluene diisocyanate was added to the Brabender Plastograph and milling continued for 3 minutes with an increase in torque. The infrared spectrum of the resulting crosslinked polymer showed a band at 1740 cm.$^{-1}$, characteristic of a urethane carbonyl group.

*Example IV*

35 grams of oxidized polyethylene containing 0.126% carbonyl was milled in the Brabender Plastograph at 160° C. and 30 r.p.m. under nitrogen. Tetraisopropyl titanate (0.96 gram) was added and the torque increased 370 meter-grams. A sample of the polymer showed a decrease of 0.018% carbonyl. 10 ml. of water was added to the molten polymer while milling over a 5 minute period. 2,4-toluene diisocyanate (0.61 gram) was then added to the polymer and milling was continued for 20 minutes. The polymer showed absorption at 1740 cm.$^{-1}$ in its infrared spectrum, indicating the presence of urethane bonds.

*Example V*

28 grams of polyethylene having a melt index of 0.59 which had been oxidized, reduced with aluminum isopropoxide and hydrolyzed were milled until molten in a Brabender Plastograph under nitrogen at a temperature in the range 156–171° C. 0.18 ml. of hexamethylene diisocyanate was added to the molten polyhydroxylated polymer under nitrogen and milling continued for 5½ minutes. The torque increased 450 meter-grams. On characterization the crosslinked polyethylene showed absorption at 1730 cm.$^{-1}$ by infrared analysis, characteristic of a urethane carbonyl group.

The following example is entered herein to show the ability of a triisocyanate to crosslink polyhydroxylated polymeric material.

*Example VI*

1125 gms. of commercially available polyethylene having a melt index of 0.7 and a density of 0.96 were milled in air in a Banbury B mixer for 2 hours at 160–170° C. The thus oxidized polymer contained 0.138% carbonyl. Milling was continued on 1102 gms. of the thus oxidized polymer at 160–170° C., while 40.2 gms. aluminum isopropoxide were added to the polymer over a ten minute period. Thereafter 380 ml. water were added to the reduced polymer over a 25 minute period to hydrolyze the polymer. The resultant hydrolyzed polymer had a melt index of 0.59, contained 0.017% carbonyl and 0.043 milliequivalent hydroxyl/g. The infrared spectra showed no absorbance at 1740 cm.$^{-1}$ of the polyhydroxylated polymer.

35 gms. of the polyhydroxylated polyethylene were milled in a Brabender Plastograph at 30 r.p.m. and 160° C. for 10 minutes. 1.63 ml. of triphenylmethane triisocyanate (20% in methylene chloride) sold under the trade name "Mondur TM" by Mobay Chemical Co. was added to the molten polymer and within 10 minutes the torque rose 660 meter-grams. The crosslinked product on characterization had a 33% gel content and the infrared spectrum showed a band at 1740 cm.$^{-1}$, characteristic of a urethane carbonyl group.

Operable metal alkoxide reducing agents in this invention include but are not limited to diethylaluminum isopropoxide, chloraluminum diisopropoxide, alumina di-n butoxy hydride, dichlorotitanium dicyclohexoxide, dichlorotitanium dicaproxide, trichlorotitanium 1-methylheptoxide, aluminum isopropoxide, tetraisopropyl titanate and the like.

The reduction step is operable at temperature in the range 50–250° C. or more. When the reduction step is carried out in the melt, the operable temperature ranges from the melting point of the polymeric material up to 250° C. or more. When the reducing step is carried out in suspension in a two-phase heterogeneous system, any of various inert hydrocarbon solvents for the metal alkoxides having a boiling point greater than 50° C. can be employed at temperatures below the solution temperature of the polymer. Such solvents include benzene, toluene, hexane, cyclohexane, and the like.

The reducing step of the instant invention is also operable in solution. High boiling solvents such as toluene, xylene, decahydronaphthalene and the like can be employed for such a purpose in the case of polyethylene. Even lower boiling hydrocarbon solvents such as benzene can be used if superatmospheric pressure is employed. However, for ease of handling it is preferred when an inert hydrocarbon solvent is used to carry out the reducing step in suspension at temperatures below the solution temperature of the polymer, e.g., in the range 50–100° C. for polyethylene.

The hydrolysis and the crosslinking steps are operable at temperatures ranging from the melting point of the polymeric material up to 250° C.

The invention is preferably operated at atmospheric pressure, however sub or superatmospheric pressure can be used if desired.

For any given concentration of carbonyl in the polymeric material to be reduced, the amount of reduction is dependent upon the amount of metal alkoxide added. An equivalency ratio of carbonyl:metal alkoxide in the range of 1:0.1 to 100 or more is operable. A preferred range is 1:10 to 50 respectively.

When carbonyl groups are introduced into the polymeric material by oxidation, it is preferred that oxidation stabilizers, i.e. antioxidants not be present. However, even if antioxidants are present the invention is operable, only requiring the oxidation step to be of longer duration in order to use up the antioxidant prior to forming carbonyl groups.

The polyisocyanates employable as crosslinking agents in this invention are many and varied. Examples of such polyisocyanates include but are not limited to 2,4-toluene diisocyanate; 2,6-toluene diisocyanate; 3,3'-bitoluene-4,4'-diisocyanate; diphenylmethane-4,4'-diisocyanate; 3,3'-dimethyldiphenylmethane-4,4'-diisocyanate; hexamethylene diisocyanate; urethane polymers containing at least two free isocyanate groups; 1,3,5 tris (2-methyl-5-isocyanatophenyl) isocyanate; tris-(4-isocyanatophenyl) methane; trimethylolpropane tris-N-(4-methyl-3-isocyanatophenyl) carbamate and the like. Any organic polyisocyanate of the formula, $R(NCO)_x$, wherein R is a hydrocarbon group containing at least four carbon atoms and x is two or more is operable to crosslink the polymeric material by the instant invention.

For optimum crosslinking the amount of isocyanate crosslinking agent used is at least a stoichiometric amount necessary to react with the hydroxyl groups formed on the polymer. Preferably an excess of isocyanate is added i.e. up to 5 times a stoichiometric amount based on the hydroxyl groups present.

The crosslinked polymeric material of this invention has many and varied uses. For example, the crosslinked polymeric material can be used where increased solvent resistance, increased tensile strength and improved clarity are required such as in film, coatings, laminates and the like.

This application is a continuation in part of application having Serial Number 147,755, filed October 26, 1961, now abandoned.

What is claimed is:

1. The process of crosslinking polyhydroxylated polyethylene containing more than 2 hydroxyl groups per molecule at least one of said hydroxyl groups being a secondary hydroxyl, which consists essentially of reacting said polyethylene at a temperature ranging from its melting point up to 250° C. with an organic polyisocyanate of the formula $R(NCO)_x$ wherein R is a hydrocarbon group containing at least four carbon atoms and x is at least 2, the amount of said polyisocyanate reacted with the polyhydroxylated polyethylene being at least the stoichiometric amount needed to react with the hydroxyl groups present in the polyhydroxylated polyethylene.

2. Composition useful in the production of crosslinked polyhydroxylated polyethylene consisting essentially of polyhydroxylated polyethylene containing more than 2 hydroxyl groups/molecule at least one of said hydroxyl groups being a secondary hydroxyl and at least the stoichiometric amount needed to react with said hydroxyl groups of an organic polyisocyanate of the formula $R(NCO)_x$ wherein R is a hydrocarbon group containing at least four carbon atoms and x is at least 2.

3. A composition of matter consisting essentially of polyisocyanate-crosslinked polyhydroxylated polyethylene.

4. Process of crosslinking polyhydroxylated polyethylene containing more than 2 hydroxyl groups/molecule, said polyhydroxylated polyethylene being prepared by oxidizing polyethylene until more than two carbonyl groups/polymer molecule are formed, subjecting said carbonyl-containing polyethylene at a temperature ranging from the melting point of the polyethylene up to 250° C. to the action of a reducing agent consisting essentially of a metal alkoxide compound of the general formula $M(OR)_{y-z}X_z$ wherein M is a member of the group consisting of aluminum and titanium, OR is an alkoxy group containing 1 to 8 carbon atoms, X is a member of the group consisting of halogen, hydrogen and an alkyl group containing 1 to 8 carbon atoms, y is equal to the valence of M and z is equal to zero to y–1, said reducing agent to carbonyl in the polyethylene having an equivalency ratio of 0.1: to 100:1, reacting the thus reduced polyethylene with water to form polyhydroxylated polyethylene containing more than two hydroxyl groups/molecule of polyethylene and thereafter reacting said polyhydroxylated polyethylene with an organic polyisocyanate of the formula: $R(NCO)_x$ wherein R is a hydrocarbon group containing at least four carbon atoms and x is at least 2, the amount of said polyisocyanate reacted with the polyhydroxylated polyethylene being at least the stoichiometric amount needed to react with the hydroxyl groups present in the polyhydroxylated polyethylene.

5. Process of crosslinking polyhydroxylated polyethylene containing more than 2 hydroxyl groups/molecule, said polyhydroxylated polyethylene being prepared by oxidizing polyethylene until more than two carbonyl groups/polymer molecule are formed, heating in a range 50–100° C. said carbonyl-containing polyethylene in suspension in an inert hydrocarbon solvent having a boiling point greater than 50° C. in the presence of a reducing agent consisting essentially of a metal alkoxide compound of the general formula $M(OR)_{y-z}X_z$ wherein M is a member of the group consisting of aluminum and titanium, OR is an alkoxy group containing 1 to 8 carbon atoms, X is a member of the group consisting of halogen, hydrogen and an alkyl group containing 1 to 8 carbon atoms, y is equal to the valence of M and z is equal to zero to y–1, said reducing agent to carbonyl in the polyethylene having an equivalency ratio of 0.1: to 100:1, reacting said suspension with water in the vapor phase to form polyhydroxylated polyethylene containing more than two hydroxyl groups/molecule of polyethylene, separating said polyhydroxylated polyethylene suspension from the liquid and vapor phase and thereafter reacting said polyhydroxylated polyethylene at a temperature ranging from its melting point up to 250° C. with an organic polyisocyanate of the formula: $R(NCO)_x$ wherein R is a hydrocarbon group containing at least four carbon atoms and x is at least 2, the amount of said polyisocyanate reacted with the polyhydroxylated polyethylene being at least the stoichiometric amount needed to react with the hydroxyl groups present in the polyhydroxylated polyethylene.

6. A composition of matter consisting essentially of polyhydroxylated polyethylene crosslinked to a three dimensional gel structure with an organic polyisocyanate of the formula $R(NCO)_x$ wherein R is a hydrocarbon group containing at least four carbon atoms and x is at least 2.

7. A composition of matter consisting essentially polyhydroxylated polyethylene containing more than two hydroxyl groups per molecule, at least one of said hydroxyl groups being a secondary hydroxyl group, said polyethylene being crosslinked through said hydroxyl groups with an organic polyisocyanate of the formula: $R(NCO)_x$ wherein R is a hydrocarbon group containing at least four carbon atoms and x is at least 2.

(References on following page)

References Cited by the Examiner

UNITED STATES PATENTS

| | | | |
|---|---|---|---|
| 2,386,347 | 10/45 | Roland | 260—77.5 |
| 2,439,514 | 4/48 | Herndon | 260—77.5 |
| 2,877,212 | 3/59 | Seligman | 260—77.5 |
| 2,897,127 | 7/59 | Miller | 260—77.5 |
| 3,040,002 | 6/62 | Aldridge | 260—77.5 |

FOREIGN PATENTS

| | | |
|---|---|---|
| 540,198 | 10/56 | Belgium. |
| 887,856 | 7/49 | Germany. |

LEON J. BERCOVITZ, *Primary Examiner.*

UNITED STATES PATENT OFFICE
CERTIFICATE OF CORRECTION

Patent No. 3,210,323

October 5, 1965

Richard W. Bush et al.

It is hereby certified that error appears in the above numbered patent requiring correction and that the said Letters Patent should read as corrected below.

Column 8, lines 19 and 46, for "0.1: to 100:1", each occurrence, read -- 0.1:1 to 100:1 --.

Signed and sealed this 7th day of June 1966.

(SEAL)

Attest:

ERNEST W. SWIDER
Attesting Officer

EDWARD J. BRENNER
Commissioner of Patents